United States Patent [19]

Miura et al.

[11] Patent Number: 5,427,753

[45] Date of Patent: Jun. 27, 1995

[54] PROCESS FOR REMOVING NITROGEN OXIDES FROM OXYGEN RICH EXHAUST GAS

[75] Inventors: Hiroshi Miura; Senshi Kasahara, both of Shinnanyo; Hidekazu Aoyama, Tokuyama; Kazuhiko Sekizawa, Shinnanyo; Shoji Adachi, Tokuyama, all of Japan

[73] Assignee: Tosoh Corporation, Shinnanyo, Japan

[21] Appl. No.: 171,156

[22] Filed: Dec. 22, 1993

[30] Foreign Application Priority Data

Dec. 24, 1992 [JP] Japan .................................. 4-344534
Aug. 23, 1993 [JP] Japan .................................. 5-207479
Nov. 19, 1993 [JP] Japan .................................. 5-290550

[51] Int. Cl.$^6$ ............................................. C01B 21/04
[52] U.S. Cl. .............................. 423/239.2; 423/213.5
[58] Field of Search ................ 423/213.2, 213.5, 239.2

[56] References Cited

U.S. PATENT DOCUMENTS

| | | | |
|---|---|---|---|
| 4,867,954 | 9/1989 | Staniulis et al. | 423/239 |
| 5,039,644 | 8/1991 | Lachman et al. | 502/208 |
| 5,041,270 | 8/1991 | Fujitani et al. | 423/213.2 |
| 5,227,145 | 7/1993 | Kintaichi et al. | 423/239 |

FOREIGN PATENT DOCUMENTS

| | | |
|---|---|---|
| 0299294 | 1/1989 | European Pat. Off. . |
| 0494388 | 7/1992 | European Pat. Off. . |
| 0585025 | 3/1994 | European Pat. Off. . |
| 0299294 | 7/1988 | Germany . |
| 3941541 | 6/1990 | Germany . |
| 60-125250 | 7/1985 | Japan . |
| 63-100919 | 5/1988 | Japan . |

*Primary Examiner*—Michael Lewis
*Assistant Examiner*—Thomas G. Dunn, Jr.
*Attorney, Agent, or Firm*—Oblon, Spivak, McClelland, Maier & Neustadt

[57] ABSTRACT

Nitrogen oxides are removed from an oxygen rich exhaust gas containing nitrogen oxides and hydrocarbons by bringing the oxygen rich exhaust gas into contact with a catalyst composed of phosphorus and at least one active metal contained in a zeolite having a molar ratio of $SiO_2/Al_2O_3$ of at least 15.

7 Claims, No Drawings

PROCESS FOR REMOVING NITROGEN OXIDES FROM OXYGEN RICH EXHAUST GAS

BACKGROUND OF THE INVENTION

1. Field of the Invention

The present invention relates to a process for catalytically removing nitrogen oxides from an oxygen rich exhaust gas containing nitrogen oxides and hydrocarbons, exhausted from, for example, boilers, automobile engines. More specifically, it relates to a process for removing nitrogen oxides using a catalyst extremely superior in activity and durability.

The term "oxygen rich exhaust gas" used herein is intended to mean an exhaust gas containing oxygen in an amount exceeding the amount of oxygen necessary for completely oxidizing reducing agent such as carbon monoxide, hydrocarbons contained in the exhaust gas. Specific examples of such an exhaust gas include exhaust gases discharged, for example, from internal combustion engines of automobiles operating at a high air/fuel ratio (i.e., in the lean burn region).

2. Description of the Related Art

The processes for removing nitrogen oxides from an exhaust gas discharged from boilers, automobile engines, and the like, which are in actual use are the process of selective catalytic reduction using ammonia in the presence of a catalyst or the process of nonselective catalytic reduction which passes the exhaust gas through a catalyst and reduces it by the unburnt carbon monoxide and hydrocarbons.

Japanese Unexamined Patent Publication (Kokai) No. 60-125250 proposes a copper-ion-exchanged zeolite as a catalyst for the catalytical direct decomposition of nitrogen oxides in the absence of a reducing agent.

For purifying the exhaust gas of diesel engines or lean burn engines designed for reduced fuel consumption, further, there has been proposed a catalyst which includes a base (or non-noble) metal in the zeolite etc. as a catalyst capable of selectively reducing the nitrogen oxides by a reducing agent of the unburnt carbon monoxide, hydrocarbons, etc. even in an oxygen rich atmosphere (Japanese Unexamined Patent Publication (Kokai) No. 63-100919).

These proposed catalysts, however, suffer from problems, in particular their durability, at a high temperatures, and therefore, are not yet suitable for practical use.

SUMMARY OF THE INVENTION

The object of the present invention is to provide a process for efficiently purifying an exhaust gas, in particular an oxygen rich exhaust gas discharged from an internal combustion engine of, for example, an automobile, without using a reducing agent such as ammonia and for purifying an exhaust gas using a catalyst superior in durability at a high temperature in the presence of steam.

The present inventors engaged in intensive studies on the above problem and, as a result, found that by using a catalyst obtained by introducing phosphorus and one or more active metals to a zeolite, it is possible to efficiently purify an exhaust gas even after use at a high temperature and thus completed the present invention.

That is, in accordance with the present invention there is provided a process for removing nitrogen oxides from an oxygen rich exhaust gas containing nitrogen oxides and hydrocarbons, comprising bringing the oxygen rich exhaust gas into contact with a catalyst composed of phosphorus and at least one active metal contained in a zeolite having a molar ratio of $SiO_2/Al_2O_3$ of at least 15.

DESCRIPTION OF THE PREFERRED EMBODIMENTS

The present invention will be explained in more detail below.

The catalyst used in the present invention is a catalyst composed of a zeolite having a molar ratio of the $SiO_2/Al_2O_3$ of at least 15 in which phosphorus and at least one active metal are contained.

The molar ratio of the $SiO_2/Al_2O_3$ of the zeolite usable in the present invention should be at least 15. There is no upper limit on the molar ratio of the $SiO_2/Al_2O_3$. If the molar ratio of the $SiO_2/Al_2O_3$ is less than 15, a sufficient durability cannot be obtained. The preferable molar ratio is 15 to 200.

The type of the zeolite is also not particularly limited. For example, use may be made of mordenite, ferrierite, zeolite-$\beta$, ZSM-5, ZSM-8, ZSM-11, ZSM-12, ZSM-20, ZSM-35, or other zeolites. Among these, ZSM-5 is preferably used. The processes for producing these zeolites are also not limited. Further, they may also be dealuminated zeolites such as zeolite Y and zeolite L.

The zeolite usable is one as synthesized or after calcination. It is also possible to use the zeolite ion-exchanged with a proton or ammonium ion by treating the ions of, for example, sodium in the zeolite by an ammonium salt or mineral acid etc. Further, use may be made of one ion exchanged with, for example, potassium, cesium, barium.

The method of incorporation of the phosphorus into the zeolite catalyst is not particularly limited, but it is possible to introduce it by a impregnation method using a conventional aqueous solution or organic solvent. Further, it may be introduced by a physical mixing method in which a phosphorus compound is physically mixed with a zeolite in the solid state or in the solution. Also, it is possible to treat the zeolite using a gas containing a phosphorus compound to introduce the same to the zeolite. Furthermore, when copper phosphate or silver phosphate is introduced into a zeolite, a conventional precipitation method may be preferably used. That is, an aqueous solution of a copper salt (for example, copper acetate, copper nitrate, copper sulfate, copper chloride, or other soluble copper salts) or an aqueous solution of a silver salt (for example, silver acetate, silver nitrate, silver sulfate, or other soluble silver salts) and an aqueous solution of a phosphoric acid (for example, orthophosphoric acid, pyrophosphoric acid, or metaphosphoric acid) or an aqueous solution of a phosphate (for example, ammonium dihydrogen phosphate, diammonium hydrogen phosphate, dipotassium hydrogen phosphate) are mixed in the presence of the zeolite to thereby precipitate the copper phosphate or silver phosphate.

The type of the phosphorus compounds usable for incorporating the phosphorus into the zeolite is not particularly limited, but as the phosphorus compounds, phosphoric acids or phosphates are preferably used. As the phosphoric acids, orthophosphoric acid, pyrophosphoric acid, and metaphosphoric acid are preferable. As the phosphates, triammonium phosphate, diammonium hydrogen phosphate, and ammonium dihydrogen phosphate are preferable or dipotassium hydrogen phosphate, calcium pyrophosphate, calcium phosphate, calcium hydrogen phosphate, barium phosphate, and other phosphates including alkali metals or alkaline earth metals as salts are preferable. Similarly, copper phosphate and silver phosphate are also preferable. In addition, use may also be made of trimethylphosphine, triphenylphosphine, and other phosphoalkyl compounds, trimethyl phosphite and other phosphite esters, and phosphorus pentachloride and other phosphorus halides.

The content of the phosphorus in the zeolite catalyst is not particularly limited, but it is preferable when the phosphorus atom is present in an amount of 0.01 to 10 times higher than the aluminum atom in the zeolite, more preferably 0.10 to 1 times. To stabilize the phosphorus in the catalyst, the phosphorus-containing catalyst may be heat treated at a temperature of 100° C. to 900° C., preferably 300° C. to 800° C. The atmosphere of the heat treatment is not limited, but mention may be made of an atmosphere of vacuum, air, or steam.

To the phosphorus-containing zeolite, one or more active metals are introduced. As the active metal, any metal which is ordinarily used for the purification of an exhaust gas may be used, for example, metals Group Ib such as, copper, silver, gold, metals of Group VIII such as, iron, cobalt, nickel, ruthenium, rhodium, palladium, platinum, metals of Group VIa such as, chromium, molybdenum, or metals of Group VIIa such as, manganese may be used. Particularly copper or cobalt are preferable.

The method of introduction of the active metal into the zeolite catalyst is not particularly limited. Use may be made of techniques such as impregnation, or ion exchange. When the active metal is present at an ion exchange site of the zeolite catalyst, it has high durability, and therefore, it is preferable to introduce the active metal into the zeolite by an ion-exchange method.

The ion exchange may be carried out by mixing the phosphorus-containing zeolite into an aqueous solution containing salts of the active metal, followed by stirring and washing.

As the salts of the active metal, use may suitably be made of salts of the active metals, such as chlorides, nitrates, sulfates, acetates. Further, use may suitably be used of, for example, ammine complex salts of active metals.

In the ion exchange process, the amount of addition of the active metals, the concentration of the active metals and the ion-exchange temperature and time, etc. at the time of ion exchange are not particularly limited. The conventional methods may be used. The amount of addition of the active metal is preferably 0.5 to 20 times higher than the aluminum atom in the zeolite so as to give sufficient activity and durability. Further, the concentration of the slurry for ion exchange is preferably 5% to 50% by weight, as usual. The ion exchange temperature and time are preferably from room temperature to 100° C. and 5 minutes to three days so as to give sufficient activity and durability. Further, the ion exchange operation may be repeatedly performed, if necessary.

As mentioned above, the exhaust gas purification catalyst used in the present invention can be prepared.

It is also possible to first introduce one or more active metals into the zeolite and then to introduce phosphorus by the above-mentioned method to prepare the exhaust gas purification catalyst according to the present invention.

The exhaust gas purification catalyst according to the present invention may be used by mixing with a clay mineral or other binder, followed by molding into a specific form. Further, it is also possible to mold the zeolite or the phosphorus-containing zeolite into a specific form and then to introduce the phosphorus or active metals thereto. As the binder usable when molding zeolite, there are kaolin, attapulgite, montmorillonite, bentonite, allophane, sepiolite, and other clay minerals. Alternatively, it is possible to use a binderless zeolite molded article obtained by directly synthesizing the molded article without use of a binder. In addition, use may be made of the exhaust gas purification catalyst used in the present invention to give a wash coat to a cordierite or metal honeycomb support.

The exhaust gas purification catalyst prepared as mentioned above is made to contact with the oxygen rich exhaust gas containing nitrogen oxides and hydrocarbons to remove the nitrogen oxides. The exhaust gas usable in the present invention should contain nitrogen oxides and hydrocarbons and excess oxygen, but the invention is also effective in the case that carbon monoxide, hydrogen, etc. are contained.

The space velocity, temperature, etc. at the removal of the nitrogen oxides are not particularly limited, but a space velocity of 100 to 500,000 $hr^{-1}$ and a temperature of 200° C. to 800° C. are preferable.

EXAMPLES

The present invention will now be explained in further detail using Examples. These Examples, however, do not restrict the present invention in any way.

EXAMPLE 1

An overflow type reaction vessel with a net volume of 2 liters under an agitating state was continuously fed with an aqueous sodium silicate solution ($SiO_2$; 250 g/liter, $Na_2O$; 82 g/liter, $Al_2O_3$; 2.8 g/liter) and an aqueous aluminum sulfate solution ($Al_2O_3$; 8.8 g/liter, $H_2SO_4$; 370 g/liter) at rates of 3 liters/hr and 1 liter/hr, respectively. The reaction temperature was 30° C. to 32° C. and the pH of the discharged slurry was 6.7 to 7.0.

The discharged slurry was subjected to solid-liquid separation and the separated solid matter was fully washed with water, to obtain a homogeneous compound of a granular, amorphous aluminosilicate having 0.75% by weight of $Na_2O$, 0.77% by weight of $Al_2O_3$, 36.1% by weight of $SiO_2$, and 62.5% by weight of $H_2O$. A 2,860 g amount of the homogeneous compound and 6,150 g of an aqueous 3.2% by weight NaOH solution were charged into an autoclave and heated at 160° C. for 72 hours with stirring to crystallize. The product was subjected to solid-liquid separation, then the resultant product was washed with water and dried to obtain the ZSM-5 type zeolite. The chemical analysis thereof showed that the composition was as follows, expressed by the molar ratio of the oxides on an anhydrous basis:

$1.3Na_2O, Al_2O_3, 41SiO_2$

A 10 g amount of the zeolite obtained above was added to 100 cc of an aqueous solution containing 2 g of $NH_4Cl$. The mixture was stirred at 60° C. for 20 hours, then washed and dried, to subjected to a conventional $NH_4$ ion exchange treatment to obtain an ammonium ion exchanged zeolite.

A 10 g amount of the ammonium ion exchanged zeolite obtained above was immersed in 70 cc of an aqueous solution of 1.2% by weight of diammonium hydrogen phosphate, then was dried. Next, the resultant product was calcined under an air stream at 550° C. for 5 hours to obtain a phosphorus-containing zeolite.

This phosphorus-containing zeolite was added to 41 cc of an aqueous solution of 0.1 mol/liter of copper acetate and adjusted to a pH of 10.5 by adding ammonia water, then was stirred at a room temperature for 20 hours, then washed, to subject to a conventional Cu ion exchange operation. This operation was repeated twice, then the product was dried to prepare a blue-violet colored catalyst 1. Chemical analysis thereof showed that the composition was as follows, expressed by the molar ratio of the oxides on an anhydrous basis:

$1.05CuO, 0.41P_2O_5, Al_2O_3, 41SiO_2$

EXAMPLE 2

The same procedure of Example 1 was repeated to prepare a blue-violet colored catalyst 2, except that, instead of the aqueous solution of the 1.2% by weight of diammonium hydrogen phosphate, use was made of 33 cc of an aqueous solution of 1.9% by weight orthophosphoric acid. Chemical analysis thereof showed that the composition was as follows, expressed by the molar ratio of the oxides on an anhydrous basis:

$0.88CuO, 0.39P_2O_5, Al_2O_3, 41SiO_2$

EXAMPLE 3

A 10 g amount of the ammonium ion exchanged zeolite prepared in the same way as in Example 1 was added to 41 cc of an aqueous solution of 0.1 mol/liter copper acetate and adjusted to a pH of 10.5 by adding ammonia water, then was stirred at room temperature for 20 hours, then washed, to subject to a conventional Cu ion exchange operation. This operation was repeated twice, then the product was dried to prepare a Cu ion exchanged zeolite.

A 10 g amount of the resultant Cu ion exchanged zeolite was immersed in 70 cc of an aqueous solution of 1.2% by weight diammonium hydrogen phosphate, then was dried. Next, this was calcined under an air stream at 550° C. for 5 hours to obtain a blue-violet colored catalyst 3. Chemical analysis thereof showed that the composition was as follows, expressed by the molar ratio of the oxides on an anhydrous basis:

$1.01CuO, 0.46P_2O_5, Al_2O_3, 41SiO_2$

EXAMPLE 4

The same procedure of Example 1 was repeated to prepare the catalyst 4, except that Co ion exchange was performed, instead of Cu ion exchange. The Co ion exchange was carried out as follows:

The phosphorus-containing zeolite was added to 99 cc of an aqueous solution of 0.22 mol/liter cobalt (II) acetate, stirred at 60° C. for 20 hours, then washed, to subject to a conventional Co ion exchange operation. This operation was repeated twice, then the product was dried to prepare a pink colored catalyst 4.

The catalyst 4, as a result of chemical analysis, had the following composition, expressed by the molar ratio of the oxides on an anhydrous basis:

$1.43CoO, 0.23P_2O_5, Al_2O_3, 41SiO_2$

EXAMPLE 5

The same procedure of Example 1 was repeated to obtain a blue-violet colored catalyst 5, except that the calcining at 550° C. was not carried out after the phosphorus was introduced. Chemical analysis thereof showed that the composition was as follows, expressed by the molar ratio of the oxides on an anhydrous basis:

$1.28CuO, 0.02P_2O_5, Al_2O_3, 41SiO_2$

EXAMPLE 6

The same procedure of Example 1 was repeated to prepare a blue-violet colored catalyst 6, except that, instead of the aqueous solution of the 1.2% by weight of diammonium hydrogen phosphate, use was made of an aqueous solution of 2.4% by weight of diammonium hydrogen phosphate. Chemical analysis thereof showed that the composition was as follows, expressed by the molar ratio of the oxides on an anhydrous basis:

$0.74CuO, 1.20P_2O_5, Al_2O_3, 41SiO_2$

EXAMPLE 7

The same procedure of Example 1 was repeated, to prepare the blue-violet colored catalyst 7, except that K ion exchange was performed, instead of the ammonium ion exchange. The K ion exchange was carried out by adding 10 g of ZSM-5 type zeolite to 100 cc of an aqueous solution containing 2.8 g of KCl, stirring at 60° C. for 20 hours, then washing, repeating this operation twice, then drying. Chemical analysis thereof showed the composition was as follows expressed by the molar ratio of the oxides on an anhydrous basis:

$1.20CuO, 0.79P_2O_5, 0.10K_2O, Al_2O_3, 41SiO_2$

EXAMPLE 8

A 71 cc amount of an aqueous solution of 1.5% by weight of ammonium dihydrogen phosphate was added dropwise to 143 cc of an aqueous solution of 1.2% by weight of calcium acetate to precipitate the phosphorus compounds. Then, 10 g of the ammonium ion exchanged zeolite obtained in Example 1 was added and the mixture was stirred at 60° C. for 2 hours, then washed and dried. Next, this was calcined under an air stream at 500° C. for 5 hours to obtain a phosphorus-containing zeolite. This phosphorus-containing zeolite was measured by X-ray diffraction, as a result of which calcium pyrophosphate was observed.

The phosphorus-containing zeolite thus obtained was added to 41 cc of an aqueous solution of 0.1 mol/liter of copper acetate and adjusted to a pH of 10.5 by adding ammonia water, then was stirred at room temperature for 20 hours, then washed, to subject to a conventional Cu ion exchange operation. This operation was repeated twice, then the product was dried to prepare a blue-violet colored catalyst 8. Chemical analysis thereof showed, that the composition was as follows, expressed by the molar ratio of the oxides on an anhydrous basis:

1.02CuO, 1.46CaO, 0.72P$_2$O$_5$, Al$_2$O$_3$, 41SiO$_2$

EXAMPLE 9

An aqueous solution obtained by adjusting 71 cc of an aqueous solution of 3.1% by weight of ammonium dihydrogen phosphate to a pH of 10.5 by adding ammonia water was added dropwise to 143 cc of an aqueous solution of 3.4% by weight of calcium acetate to precipitate the phosphorus compounds. Then, 10 g of the ammonium type zeolite obtained in Example 1 was added and the mixture was stirred at 60° C. for 2 hours, then washed and dried. Next, this was calcined under an air stream at 800° C. for 5 hours to obtain a phosphorus-containing zeolite. This phosphorus-containing zeolite was measured by X-ray diffraction, as a result of which β-calcium phosphate was observed.

This phosphorus-containing zeolite was added to 41 cc of an aqueous solution of 0.1 mol/liter copper acetate and adjusted to a pH of 10.5 by adding ammonia water, then was stirred at room temperature for 20 hours, then washed, to subject to a conventional Cu ion exchange operation. This operation was repeated twice, then the product was dried to prepare a blue-violet colored catalyst 9. Chemical analysis thereof showed that the composition was as follows, expressed by the molar ratio of the oxides on an anhydrous basis:

0.67CuO, 6.84CAO, 2.42P$_2$O$_5$, Al$_2$O$_3$, 41SiO$_2$

EXAMPLE 10

A 10 g amount of the phosphorus-containing zeolite prepared by the same method as in Example 1 was immersed in 100 cc of an aqueous solution of 0.035 mol/liter of copper acetate and then dried to load copper on the zeolite, instead of performing ion exchange of copper. Next, the resultant solid product was calcined under an air stream at 600° C. for one hour to prepare the gray colored catalyst 10. Chemical analysis thereof showed that the composition was as follows, expressed by the molar ratio of the oxides on an anhydrous basis:

1.03CuO, 0.90P$_2$O$_5$, Al$_2$O$_3$, 41SiO$_2$

EXAMPLE 11

The durability was evaluated using the catalysts 1 to 10 obtained in Examples 1 to 10.

Each catalyst was press-molded and then pulverized to regulate the size of granules to 12 to 20 mesh. A 2 cc volume of each of the granular catalysts was packed in an atmospheric fixed bed reaction tubes, then a gas (Table 1) simulating the exhaust gas of a lean burn engine was passed at a space velocity of 120,000/hr. The samples were treated for endurance at 800° C. for 5 hours, and thereafter, after pre-treating at 550° C. for 30 minutes, then the steady-state purification activities at different temperatures were measured. The steady-state purification activity was expressed by the NOx conversion after holding at each temperature for 1 hour.

The results are shown in Table 2.

TABLE 1

| Gas | Gas Composition Composition |
|---|---|
| CO | 0.12 vol % |
| C$_3$H$_6$ | 0.08 vol % |
| NO | 0.12 vol % |
| O$_2$ | 4 vol % |
| CO$_2$ | 12 vol % |
| H$_2$O | 10 vol % |
| N$_2$ | balance |

TABLE 2

NO and C$_3$H$_6$ Conversion (%) at Various Temperatures After Endurance Treatment

| Catalyst No. | 300° C. | | 400° C. | | 500° C. | |
|---|---|---|---|---|---|---|
| | NO | C$_3$H$_6$ | NO | C$_3$H$_6$ | NO | C$_3$H$_6$ |
| Catalyst 1 | 4 | 5 | 17 | 62 | 26 | 95 |
| Catalyst 2 | 3 | 5 | 15 | 61 | 24 | 95 |
| Catalyst 3 | 3 | 7 | 14 | 61 | 24 | 95 |
| Catalyst 4 | 2 | 5 | 13 | 21 | 21 | 52 |
| Catalyst 5 | 2 | 10 | 10 | 60 | 22 | 94 |
| Catalyst 6 | 2 | 3 | 11 | 45 | 20 | 89 |
| Catalyst 7 | 3 | 0 | 16 | 23 | 25 | 70 |
| Catalyst 8 | 0 | 9 | 12 | 63 | 18 | 96 |
| Catalyst 9 | 0 | 1 | 8 | 31 | 18 | 86 |
| Catalyst 10 | 2 | 12 | 9 | 63 | 19 | 96 |

EXAMPLE 12

A 10 g amount of the ammonium ion exchanged zeolite prepared by the same method as in Example 1 was added to 142 cc of an aqueous solution of 0.034 mol/liter of copper acetate and then stirred. Then, 71 cc of an aqueous solution of 0.092 mol/liter of ammonium dihydrogen phosphate was added dropwise to precipitate the copper phosphate, then the resultant was stirred at 60° C. for 2 hours, then washed and dried. Next, the solid product was calcined under an air stream at 500° C. for 5 hours to prepare the copper phosphate-containing zeolite.

This copper phosphate-containing zeolite was added to 41 cc of an aqueous solution of 0.1 mol/liter copper acetate and was stirred at 50° C. for 20 hours, then washed, to subject to a conventional Cu ion exchange operation. This operation was repeated four times, then the product was dried to prepare the catalyst 11. Chemical analysis thereof showed that the composition was as follows, expressed by the molar ratio of the oxides on an anhydrous basis:

2.39CuO, 0.28P$_2$O$_5$, Al$_2$O$_3$, 41SiO$_2$

EXAMPLE 13

A 10 g amount of the ammonium ion exchanged zeolite obtained in Example 12 was added to 100 cc of an aqueous solution of 0.06 mol/liter of copper sulfate and then stirred. Then, 100 cc of an aqueous solution of 0.035 mol/liter of dipotassium hydrogen phosphate was added dropwise to precipitate the copper phosphate, then the resultant was washed and dried. Next, the solid product was calcined under an air stream at 500° C. for 5 hours to prepare the copper phosphate-containing zeolite.

The copper phosphate-containing zeolite obtained above was added to 41 cc of an aqueous solution of 0.1 mol/liter copper acetate and was stirred at 40° C. for 20 hours, then washed, to subject to a conventional Cu ion exchange operation. This operation was repeated three times, then the product was dried to prepare the catalyst 12. Chemical analysis thereof showed that the composition was as follows, expressed by the molar ratio of the oxides on an anhydrous basis:

$1.35CuO, 0.12P_2O_5, Al_2O_3, 41SiO_2$

EXAMPLE 14

A 10 g amount of a sodium ion exchanged zeolite just after synthesis, prepared by the same method as in Example 1, was added to 100 cc of an aqueous solution containing 2.8 g of KCl. The mixture was stirred at 60° C. for 20 hours, then was washed. This operation was repeated twice, then the resultant solid product was drop-dried to obtain a potassium ion exchanged zeolite. Chemical analysis thereof showed that the composition was as follows, expressed by the molar ratio of the oxides on an anhydrous basis:

$K_2O, Al_2O_3, 41SiO_2$

A 10 g amount of the potassium ion exchanged zeolite obtained above was added to 100 cc of an aqueous solution of 0.06 mol/liter of copper acetate, then was stirred. To the mixture, was added dropwise 100 cc of an aqueous solution of 0.035 mol/liter of dipotassium hydrogen phosphate to precipitate the copper phosphate, then the resultant was washed and dried. Next, the resultant solid product was calcined under an air stream at 500° C. for 5 hours to obtain a copper phosphate-containing zeolite.

The copper phosphate-containing zeolite obtained above was added to 41 cc of an aqueous solution of 0.1 mol/liter copper acetate, then was stirred at 40° C. for 20 hours, then washed, to subject to a conventional Cu ion exchange operation. This operation was repeated three times, then the product was dried to prepare the catalyst 13. Chemical analysis thereof showed that the composition was as follows, expressed by the molar ratio of the oxides on an anhydrous basis:

$1.71CuO, 0.15P_2O_5, 0.24K_2O, Al_2O_3, 41SiO_2$

EXAMPLE 15

A 10 g amount of the ammonium ion exchanged zeolite prepared by the same method as in Example 1 was added to 41 cc of an aqueous solution of 0.1 mol/liter of copper acetate and adjusted to a pH of 10.5 by adding ammonia water, then was stirred at a room temperature for 20 hours, then washed, to subject to a conventional Cu ion exchange operation. This operation was repeated twice, then the product was dried to prepare a Cu ion exchanged zeolite.

A 10 g amount of the Cu ion exchanged zeolite obtained above was mixed in a mortar, together with 0.23 g of commercially available copper phosphate (made by Katayama Kagaku Kogyo), then the mixture was calcined under an air stream at 500° C. for 5 hours to obtain the catalyst 14. Chemical analysis thereof showed that the composition was as follows, expressed by the molar ratio of the oxides on an anhydrous basis:

$1.49CuO, 0.15P_2O_5, Al_2O_3, 41SiO_2$

EXAMPLE 16

A 10 g amount of the ammonium ion exchanged zeolite prepared by the same method as in Example 1 was added to 41 cc of an aqueous solution of 0.1 mol/liter of copper acetate and adjusted to a pH of 10.5 by adding ammonia water, then was stirred at a room temperature for 20 hours, then washed, to subject to a conventional Cu ion exchanged zeolite operation. This operation was repeated twice, then the product was dried to prepare a conventional Cu-exchange type zeolite.

A 10 g amount of the Cu ion exchanged zeolite obtained above was added to 100 cc of an aqueous solution of 0.06 mol/liter of copper sulfate and then stirred. Then, 100 cc of an aqueous solution of 0.035 mol/liter of dipotassium hydrogen phosphate was added dropwise to precipitate the copper phosphate, then the resultant was washed and dried. Next, the solid product was calcined under an air stream at 500° C. for 5 hours to prepare the catalyst 15. Chemical analysis thereof showed that the composition was as follows, expressed by the molar ratio of the oxides on an anhydrous basis:

$2.85CuO, 0.35P_2O_5, Al_2O_3, 41SiO_2$

EXAMPLE 17

The same procedure of Example 12 was repeated to prepare the catalyst 16, except that Co ion exchange was performed, instead of the Cu ion exchange in Example 12. The Co ion exchange was carried out as follows:

The copper phosphate-containing zeolite was added to 90 cc of an aqueous solution of 0.22 mol/liter of cobalt (II) acetate, stirred at 60° C. for 20 hours, then washed, to subject to a conventional Co ion exchange operation. This operation was repeated twice, then the product was dried to prepare the catalyst 16. Chemical analysis thereof showed the composition was as follows, expressed by the molar ratio of the oxides on an anhydrous basis:

$1.30CoO, 0.78CuO, 0.25P_2O_5, Al_2O_3, 41SiO_2$

EXAMPLE 18

The same procedures of Example 11 were repeated to evaluate the durability of the catalysts 11 to 18. The results are shown in Table 3.

TABLE 3

| | NO and $C_3H_6$ Conversion (%) at Various Temperatures After Endurance Treatment | | | | | |
|---|---|---|---|---|---|---|
| | 300° C. | | 400° C. | | 500° C. | |
| Catalyst No. | NO | $C_3H_6$ | NO | $C_3H_6$ | NO | $C_3H_6$ |
| Catalyst 11 | 5 | 8 | 18 | 74 | 27 | 98 |
| Catalyst 12 | 5 | 7 | 19 | 70 | 28 | 97 |
| Catalyst 13 | 5 | 11 | 19 | 69 | 27 | 97 |
| Catalyst 14 | 1 | 9 | 10 | 67 | 20 | 95 |
| Catalyst 15 | 5 | 7 | 18 | 70 | 27 | 98 |
| Catalyst 16 | 3 | 7 | 15 | 25 | 23 | 54 |

EXAMPLE 19

A 10 g amount of the ammonium ion exchanged zeolite prepared in the same way as Example 1 was immersed in 142 cc of an aqueous solution of 0.050 mol/liter of silver acetate and then stirred. Then, 142 cc of an aqueous solution of 0.016 mol/liter of ammonium dihydrogen phosphate was added dropwise to precipitate the silver phosphate, then the resultant was washed and dried. Next, this was calcined under an air stream at 500° C. for 5 hours to obtain a silver phosphate-containing zeolite. Measurement of this silver phosphate-containing zeolite by X-ray diffraction showed the existance of peaks exhibiting the structure of silver phosphate in addition to zeolite.

The silver phosphate-containing zeolite obtained above was added to 41 cc of an aqueous solution of 0.1 mol/liter of copper acetate and adjusted to a pH of 10.5 by adding ammonia water, then was stirred at a room temperature for 20 hours, then washed, to subject to a conventional Cu ion exchange operation. This operation was repeated twice, then the product was dried to prepare the catalyst 17. Chemical analysis thereof showed that the composition was as follows, expressed by the molar ratio of the oxides on an anhydrous basis:

$0.92CuO, 0.53Ag_2O, 0.10P_2O_5, Al_2O_3, 41SiO_2$

EXAMPLE 20

The same procedure of Example 19 was repeated to prepare the catalyst 18, except that, instead of the aqueous solution of the 0.050 mol/liter of silver acetate in Example 19, use was made of an aqueous solution of 0.024 mol/liter of silver acetate, and that, instead of the aqueous solution of 0.016 mol/liter of ammonium dihydrogen phosphate, use was made of an aqueous solution of 0.0084 mol/liter of ammonium dihydrogen phosphate. Chemical analysis thereof showed that the composition was as follows, expressed by the molar ratio of the oxides on an anhydrous basis:

$1.10CuO, 0.30Ag_2O, 0.06P_2O_5, Al_2O_3, 41SiO_2$

EXAMPLE 21

The same procedure of Example 19 was repeated, to prepare the catalyst 19, except that Co ion exchange was performed, instead of the Cu ion exchange in Example 19. The Co ion exchange was carried out as follows:

The silver phosphate-containing zeolite was added to 90 cc of an aqueous solution of 0.22 mol/liter of cobalt (II) acetate, stirred at 60° C. for 20 hours, then washed, to subject to a conventional Co ion exchange operation. This operation was repeated twice, then the product was dried to prepare the catalyst 19. Chemical analysis thereof showed the composition was as follows, expressed by the molar ratio of the oxides on an anhydrous basis:

$1.20CuO, 0.50Ag_2O, 0.10P_2O_5, Al_2O_3, 41SiO_2$

EXAMPLE 22

The same procedures of Example 11 were repeated to evaluate the durability of the catalysts 17 to 19. The results are shown in Table 4.

TABLE 4

| | NO and C$_3$H$_6$ Conversion (%) at Various Temperatures After Endurance Treatment | | | | | |
|---|---|---|---|---|---|---|
| | 300° C. | | 400° C. | | 500° C. | |
| Catalyst No. | NO | C$_3$H$_6$ | NO | C$_3$H$_6$ | NO | C$_3$H$_6$ |
| Catalyst 17 | 5 | 8 | 19 | 76 | 27 | 97 |
| Catalyst 18 | 3 | 7 | 17 | 64 | 27 | 94 |
| Catalyst 19 | 3 | 7 | 16 | 21 | 23 | 53 |

COMPARATIVE EXAMPLE 1

The same procedure of Example 1 was repeated to prepare a blue-violet colored Cu ion exchanged ZSM-5 (i.e., Comparative Catalyst 1), except that phosphorus was not introduced on the zeolite. Chemical analysis thereof showed that the composition was as follows, expressed by the molar ratio of the oxides on an anhydrous basis:

$1.03CuO, Al_2O_3, 41SiO_2$

COMPARATIVE EXAMPLE 2

The same procedure of Example 4 was repeated to prepare a pink colored Co ion exchanged ZSM-5 (i.e., Comparative Catalyst 2), except that phosphorus was not introduced on the zeolite. Chemical analysis thereof showed that the composition was as follows, expressed by the molar ratio of the oxides on an anhydrous basis:

$1.40CoO, Al_2O_3, 41SiO_2$

COMPARATIVE EXAMPLE 3

The same procedure of Example 10 was repeated to prepare a gray colored Cu loaded ZSM-5 (i.e., Comparative Catalyst 3), except that phosphorus was not introduced on the zeolite. Chemical analysis thereof showed that the composition was as follows, expressed by the molar ratio of the oxides on an anhydrous basis:

$1.01CuO, Al_2O_3, 41SiO_2$

COMPARATIVE EXAMPLE 4

The same procedures of Example 11 were repeated using the Comparative Catalysts 1 to 3 obtained in Comparative Examples 1 to 3 to evaluate the durability of the catalysts. The results are shown in Table 5.

TABLE 5

| | NO and C$_3$H$_6$ Conversion (%) at Various Temperatures After Endurance Treatment | | | | | |
|---|---|---|---|---|---|---|
| | 300° C. | | 400° C. | | 500° C. | |
| Catalyst No. | NO | C$_3$H$_6$ | NO | C$_3$H$_6$ | NO | C$_3$H$_6$ |
| Comp. Catalyst 1 | 1 | 13 | 5 | 64 | 16 | 96 |
| Comp. Catalyst 2 | 1 | 8 | 7 | 23 | 17 | 58 |
| Comp. Catalyst 3 | 0 | 4 | 3 | 52 | 14 | 87 |

As is clear from the results shown in Table 2 to Table 5, according to the present invention, it is possible to remove nitrogen oxides efficiently even after the catalyst is used at high temperatures.

We claim:

1. A process for removing nitrogen oxides from an oxygen rich exhaust gas containing nitrogen oxides and hydrocarbons comprising bringing the oxygen rich exhaust gas into contact with a catalyst to thereby remove the nitrogen oxides from the exhaust gas, the catalyst comprising phosphorous and at least one active metal contained in a zeolite having a molar ratio of $SiO_2/Al_2O_3$ of at least 15.

2. A process for removing nitrogen oxides as claimed in claim 1, wherein phosphoric acid or a phosphate is used when said catalyst is prepared by incorporating the phosphorus into the zeolite.

3. A process for removing nitrogen oxides as claimed in claim 2, wherein the phosphate is triammonium phosphate or ammonium hydrogen phosphate or ammonium dihydrogen phosphate.

4. A process for removing nitrogen oxides as claimed in claim 2, wherein the phosphate is a phosphate containing an alkali metal or an alkaline earth metal.

5. A process for removing nitrogen oxides as claimed in claim 2, wherein the phosphate is copper phosphate or silver phosphate.

6. A process as claimed in claim 1, wherein the active metal is at least one element selected from Group Ib, Group VIII, Group VIa, and Group VIIa.

7. A process as claimed in claim 6, wherein the active metal is copper or cobalt.

* * * * *